(12) United States Patent
Ninbari

(10) Patent No.: US 12,122,334 B2
(45) Date of Patent: Oct. 22, 2024

(54) BRAKE HYDRAULIC PRESSURE CONTROL APPARATUS

(71) Applicant: Robert Bosch GmbH, Stuttgart (DE)

(72) Inventor: Tsutomu Ninbari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 17/604,811

(22) PCT Filed: Mar. 27, 2020

(86) PCT No.: PCT/IB2020/052904
§ 371 (c)(1),
(2) Date: Oct. 19, 2021

(87) PCT Pub. No.: WO2020/217114
PCT Pub. Date: Oct. 29, 2020

(65) Prior Publication Data
US 2022/0176929 A1    Jun. 9, 2022

(30) Foreign Application Priority Data

Apr. 22, 2019 (JP) .................................. 2019-080964

(51) Int. Cl.
| | |
|---|---|
| *B60T 13/14* | (2006.01) |
| *B60T 13/68* | (2006.01) |
| *B60T 17/02* | (2006.01) |
| *F04B 1/124* | (2020.01) |
| *F04B 1/128* | (2020.01) |

(Continued)

(52) U.S. Cl.
CPC .......... *B60T 13/148* (2013.01); *B60T 13/686* (2013.01); *B60T 17/02* (2013.01); *F04B 1/124* (2013.01); *F04B 1/128* (2013.01); *F04B 1/146* (2013.01); *F16D 65/0006* (2013.01)

(58) Field of Classification Search
CPC .... B60T 8/4022; B60T 8/4081; B60T 8/4031; B60T 8/368; B60T 7/042; B60T 13/146;

(Continued)

(56) References Cited

U.S. PATENT DOCUMENTS

2002/0195871 A1* 12/2002 Mohr .................... B60T 8/4022
303/115.4
2005/0175479 A1* 8/2005 Gandrud ............... F04B 23/021
417/410.3

(Continued)

FOREIGN PATENT DOCUMENTS

| CN | 101065278 A | 10/2007 |
|---|---|---|
| CN | 102123895 A | 7/2011 |

(Continued)

OTHER PUBLICATIONS

International Search Report and Written Opinion for Application No. PCT/IB2020/052904 dated Jun. 29, 2020 (11 pages).

*Primary Examiner* — Bradley T King
*Assistant Examiner* — San M Aung
(74) *Attorney, Agent, or Firm* — Michael Best & Friedrich LLP

(57) ABSTRACT

To provide a brake hydraulic pressure control apparatus capable of simplifying a measure against NVH and downsizing an outer shape of the apparatus.

The brake hydraulic pressure control apparatus that controls a hydraulic pressure in each of plural systems of hydraulic circuits includes: a pressure supply unit that includes a motor and a pump element; and a hydraulic block that includes an oil channel connected to the pressure supply unit and control valves regulating the hydraulic pressure of each of the plural systems of the hydraulic circuits. The pressure supply unit includes: the motor including a stator and a rotor; a swash plate arranged to be tilted with respect to an axial direction of a rotation axis of the rotor; and the pump element having plural pump sections driven by rotation of the motor. At least a part of the pump element is arranged in the rotor.

6 Claims, 3 Drawing Sheets

(51) Int. Cl.
*F04B 1/146* (2020.01)
*F16D 65/00* (2006.01)
(58) Field of Classification Search
CPC .... B60T 13/662; B60T 13/148; B60T 13/686; B60T 17/02; F04B 1/128; F04B 1/124; F04B 1/146; F04B 1/14; F04B 1/182; F04B 17/03; F04B 53/16; F16D 65/0006
USPC ............................................................ 303/2
See application file for complete search history.

(56) References Cited

U.S. PATENT DOCUMENTS

| | | | |
|---|---|---|---|
| 2008/0191549 A1* | 8/2008 | Giering | F04B 1/0404 303/116.4 |
| 2009/0127925 A1* | 5/2009 | Borgemenke | B60T 8/4031 417/462 |
| 2013/0180247 A1* | 7/2013 | Yamada | F04B 17/03 290/1 R |
| 2018/0334148 A1 | 11/2018 | Feigel | |

FOREIGN PATENT DOCUMENTS

| | | | | |
|---|---|---|---|---|
| CN | 103261678 A | | 8/2013 | |
| CN | 108944883 A | | 12/2018 | |
| EP | 0025714 A1 | | 3/1981 | |
| JP | 2015205686 A | | 11/2015 | |
| JP | 2019116155 A | * | 7/2019 | ............ B60T 13/168 |
| WO | 9403726 A1 | | 2/1994 | |
| WO | 2007028687 A1 | | 3/2007 | |
| WO | 2010019661 A1 | | 2/2010 | |

\* cited by examiner

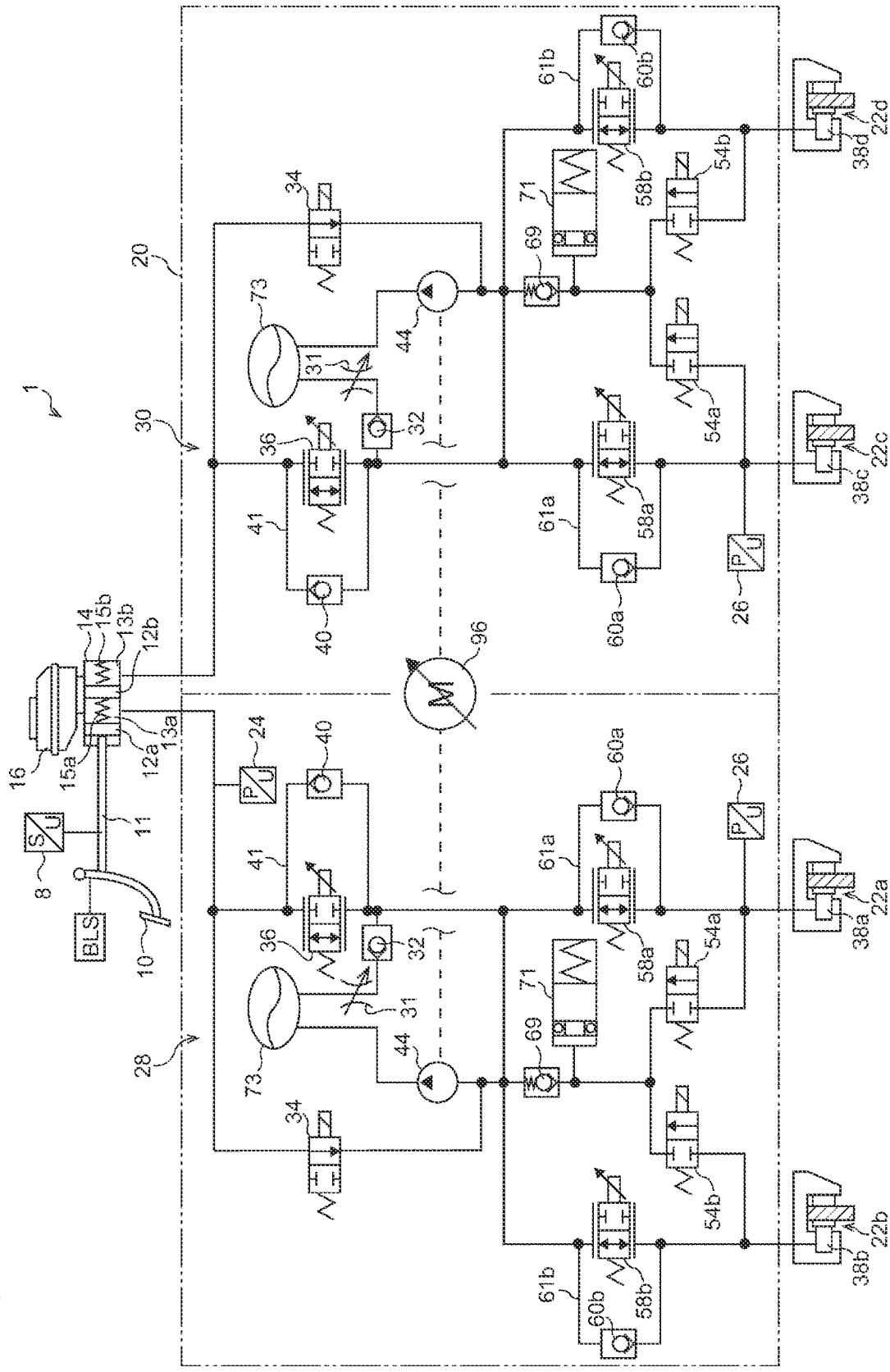
[FIG. 1]

[FIG. 2]
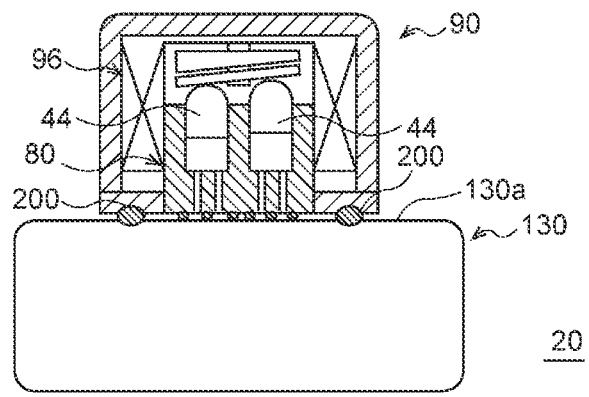
[FIG. 3]
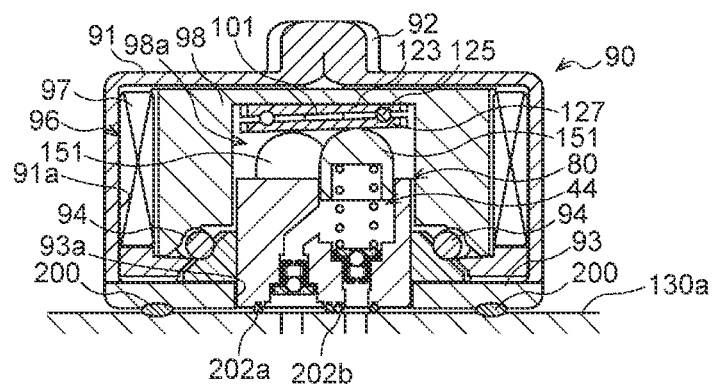
[FIG. 4]
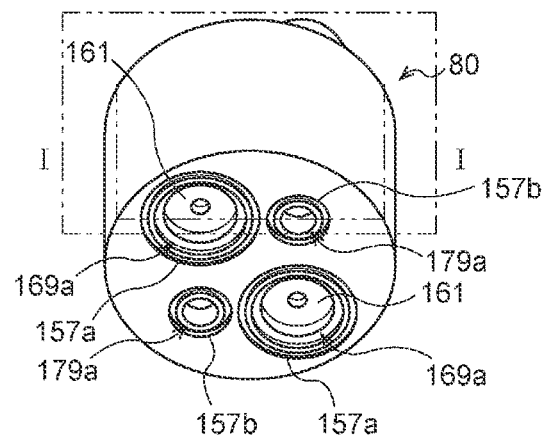

[FIG. 5]
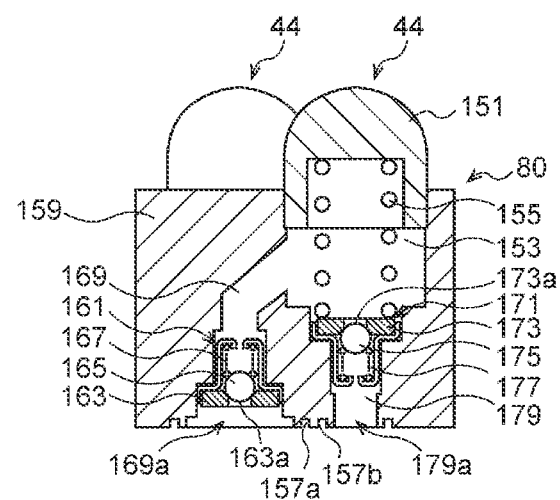

BRAKE HYDRAULIC PRESSURE CONTROL APPARATUS

BACKGROUND OF THE INVENTION

The present invention relates to a brake hydraulic pressure control apparatus that controls a hydraulic pressure in plural systems of hydraulic circuits.

Conventionally, a brake hydraulic pressure control apparatus that executes brake control by controlling a hydraulic pressure of a brake fluid to be supplied to a braking section in a hydraulic circuit has been known. The brake hydraulic pressure control apparatus includes the hydraulic circuits for two systems that are provided for a front wheel and a rear wheel in a case of a two-wheeled motor vehicle, includes the hydraulic circuits for two systems that are provided for the front wheels and the rear wheels in a case of a four-wheeled motor vehicle, or includes the hydraulic circuits for two systems that are provided for two diagonal pairs of the front wheels and the rear wheels in the case of the four-wheeled motor vehicle, for example.

The brake hydraulic pressure control apparatus includes: a freely openable/closable regulation valve; a pump element that is operated in an interlocking manner with the regulation valve; an electric motor that drives the pump element; and the like. The brake hydraulic pressure control apparatus is automatically operated by electronic control, and controls a braking force generated on each of the wheels by increasing or reducing the hydraulic pressure in the brake hydraulic circuit.

For example, the pump element has a piston that abuts an eccentric cam provided to a motor shaft and reciprocates by rotation of the eccentric cam. The pump element suctions the brake fluid via a suction valve in conjunction with the reciprocation of the piston, and discharges the brake fluid via a discharge valve (for example, see JP-A-2015-205686).

SUMMARY OF THE INVENTION

Here, in the conventional brake hydraulic pressure control apparatus, all components including the regulation valve, the pump element, the electric motor, and the like are each separately assembled to a hydraulic block that is formed with an oil channel. These components possibly become sources of noise, vibration, and harshness (NVH). Thus, a measure against NVH has to be taken for each of the components by providing a damper or the like. Meanwhile, since each of the components is separately assembled to the hydraulic block, an outer shape of the brake hydraulic pressure control apparatus possibly becomes enlarged, which deteriorates mountability of the apparatus to the vehicle.

The present invention has been made in view of the above problem and therefore provides a brake hydraulic pressure control apparatus capable of simplifying a measure against NVH and downsizing an outer shape of the apparatus.

According to an aspect of the present invention, a brake hydraulic pressure control apparatus that controls a hydraulic pressure in plural systems of hydraulic circuits is provided. The brake hydraulic pressure control apparatus includes: a pressure supply unit that includes a motor and a pump element; and a hydraulic block that includes an oil channel connected to the pressure supply unit and control valves regulating the hydraulic pressure in each of the plural systems of the hydraulic circuits. The pressure supply unit includes: the motor having a stator and a rotor; a swash plate arranged to be tilted with respect to an axial direction of a rotation axis of the rotor; and the pump element having plural pump sections driven by rotation of the motor. At least a part of the pump element is arranged in the rotor.

According to the present invention as described so far, it is possible to simplify a measure against NVH for the brake hydraulic pressure control apparatus and downsize an outer shape of the apparatus.

BRIEF DESCRIPTION OF THE DRAWINGS

FIG. 1 is a circuit diagram of a brake hydraulic circuit according to an embodiment of the present invention.

FIG. 2 is a schematic view of a brake hydraulic pressure control apparatus according to the embodiment.

FIG. 3 is a cross-sectional view of a pressure supply module according to the embodiment.

FIG. 4 is a perspective view of external appearance of a pump element according to the embodiment.

FIG. 5 is a cross-sectional view of a configuration example of the pump element according to the embodiment.

DETAILED DESCRIPTION

A detailed description will hereinafter be made on a preferred embodiment of the present invention with reference to the accompanying drawings. In the present specification and the drawings, components having the substantially same functional configuration will be denoted by the same reference sign, and thus a description thereon will not be repeated.

1. Brake Hydraulic Circuit

A description will be made on a configuration example of a brake hydraulic circuit 1, to which a brake hydraulic pressure control apparatus 20 according to this embodiment can be applied, with reference to FIG. 1.

The brake hydraulic circuit 1 according to this embodiment is applied to a brake system that increases a depression force of a brake pedal 10 by a driver without using a booster and transmits the increased depression force to a wheel cylinder. The brake system illustrated in FIG. 1 is a brake system for a four-wheeled motor vehicle. However, the brake hydraulic circuit 1 may be applied to a brake system that increases the depression force of the brake pedal 10 by the driver by using the booster and transmits the increased depression force to the wheel cylinder.

The driver performs a depressing operation of the brake pedal 10 when braking the vehicle. However, the depressing operation may be replaced with an operation element for the brake pedal 10 as long as the operation element can receive the driver's braking request.

The brake pedal 10 is connected to a piston rod 11. The piston rod 11 is provided with a stroke sensor 8 for detecting a stroke amount that is an axial displacement amount of the piston rod 11.

A reservoir tank 16 keeps hydraulic oil as a fluid for generating a hydraulic pressure. The reservoir tank 16 is connected to a master cylinder 14 and supplies the hydraulic oil into the master cylinder 14.

The master cylinder 14 holds a primary piston 12a and a secondary piston 12b in a manner to allow advancement and retreat thereof. The master cylinder 14 illustrated in FIG. 1 is the master cylinder 14 of a tandem-type, and has two pressure chambers 13a, 13b that are partitioned by the primary piston 12a and the secondary piston 12b.

The primary piston 12a is provided at a tip of the piston rod 11. The secondary piston 12b is connected to the primary piston 12a via a coil spring 15a that is arranged in the pressure chamber 13a. A coil spring 15b that is connected to the secondary piston 12b is arranged in the pressure chamber 13b. For example, the two coil springs 15a, 15b have the same spring force.

A volume of each of the pressure chambers 13a, 13b varies according to the stroke amount of the piston rod 11. The two pressure chambers 13a, 13b are respectively connected to hydraulic circuits 28, 30. With the operation of the brake pedal 10, the primary piston 12a and the secondary piston 12b are pressed via the piston rod 11, and the hydraulic oil moves to the hydraulic circuits 28, 30.

The brake hydraulic pressure control apparatus 20 includes the two hydraulic circuits 28, 30 having the same configurations. One hydraulic circuit 28 is supplied with the hydraulic oil from one pressure chamber 13a in the master cylinder 14. The other hydraulic circuit 30 is supplied with the hydraulic oil from the other pressure chamber 13b in the master cylinder 14.

The brake hydraulic circuit 1 according to this embodiment is configured as of a so-called X-shaped piping type in which each of the hydraulic circuits 28, 30 controls the hydraulic pressure for a pair of a front wheel and a rear wheel that are located at diagonal positions in the vehicle.

In the example illustrated in FIG. 1, the hydraulic oil is supplied to a wheel cylinder 38a in a hydraulic brake 22a for a front right wheel (FR) and a wheel cylinder 38b in a hydraulic brake 22b for a rear left wheel (RL) via the hydraulic circuit 28. In addition, the hydraulic oil is supplied to a wheel cylinder 38c in a hydraulic brake 22c for a front left wheel (FL) and a wheel cylinder 38d in a hydraulic brake 22d for a rear right wheel (RR) via the hydraulic circuit 30.

Note that the brake system is not limited to that of the X-shaped piping type. In addition, the brake system is not limited to that for the four-wheeled motor vehicle, and may be a brake system for a two-wheeled motor vehicle or a vehicle other than the two-wheeled motor vehicle.

In the brake hydraulic circuit 1 according to this embodiment, the hydraulic circuit 30 has the same configuration as the hydraulic circuit 28. Thus, a description will hereinafter be made on the hydraulic circuit 28, and a description on the hydraulic circuit 30 will not be made.

The hydraulic circuit 28, to which the hydraulic oil is supplied from the pressure chamber 13a in the master cylinder 14, includes plural electromagnetic valves. The electromagnetic valves are: a circuit control valve 36 of a normally-closed type that can be controlled linearly; a suction control valve 34 of the normally-closed type that is subjected to on/off control; booster regulators 58a, 58b (hereinafter collectively referred to as booster regulators 58 unless otherwise particularly distinguished), each of which is of a normally-open type and can be controlled linearly; and pressure regulators 54a, 54b (hereinafter collectively referred to as pressure regulators 54 unless otherwise particularly distinguished), each of which is of the normally-closed type and is subjected to the on/off control.

The hydraulic circuit 28 includes a pump section 44 that is driven by a motor 96. The hydraulic circuit 28 also includes an accumulator 71 and a damper 73.

The circuit control valve 36 communicates the master cylinder 14 and each of the booster regulators 58a, 58b or blocks the communication between the master cylinder 14 and each of the booster regulators 58a, 58b. The suction control valve 34 communicates the master cylinder 14 and a suction side of the pump section 44 or blocks the communication between the master cylinder 14 and the suction side of the pump section 44. Driving of each of the circuit control valve 36 and the suction control valve 34 is controlled by an electronic control unit (ECU), which is not illustrated.

The circuit control valve 36 has a bypass channel 41 that includes a check valve 40. The check valve 40 allows movement of the hydraulic oil from the master cylinder 14 side to the hydraulic brake 22a side of the front right wheel and the hydraulic brake 22b side of the rear left wheel via the bypass channel 41. Meanwhile, the check valve 40 disallows the movement of the hydraulic oil from the hydraulic brake 22a side of the front right wheel and the hydraulic brake 22b side of the rear left wheel to the master cylinder 14 side via the bypass channel 41.

For example, when the circuit control valve 36 is in a closed state due to failure of the circuit control valve 36, the check valve 40 guarantees the movement of the hydraulic oil from the master cylinder 14 side to the hydraulic brake 22a side of the front right wheel and the hydraulic brake 22b side of the rear left wheel.

The booster regulator 58a and the pressure regulator 54a are provided to a pipeline that communicates with the wheel cylinder 38a in the hydraulic brake 22a for the front right wheel. The booster regulator 58a and the pressure regulator 54a are used to control the hydraulic brake 22a for the front right wheel. The booster regulator 58b and the pressure regulator 54b are provided to an oil channel that communicates with the wheel cylinder 38b in the hydraulic brake 22b for the rear left wheel. The booster regulator 58b and the pressure regulator 54b are used to control the hydraulic brake 22b for the rear left wheel. Driving of each of the booster regulators 58a, 58b and the pressure regulators 54a, 54b is controlled by the ECU, which is not illustrated.

The booster regulator 58a is provided between the circuit control valve 36 and the hydraulic brake 22a for the front right wheel. The booster regulator 58a can be controlled linearly, and continuously regulates a flow rate of the hydraulic oil from a side of the master cylinder 14 and the circuit control valve 36 to the wheel cylinder 38a side of the hydraulic brake 22a for the front right wheel.

The booster regulator 58a has a bypass channel 61a that includes a check valve 60a. The check valve 60a allows movement of the hydraulic oil from the hydraulic brake 22a side of the front right wheel to the side of the master cylinder 14 and the circuit control valve 36 via the bypass channel 61a. Meanwhile, the check valve 60a disallows the movement of the hydraulic oil from the side of the master cylinder 14 and the circuit control valve 36 to the hydraulic brake 22a side of the front right wheel via the bypass channel 61a.

For example, when the booster regulator 58a is brought into the closed state due to failure of the booster regulator 58a, the check valve 60a guarantees the movement of the hydraulic oil from the hydraulic brake 22a side of the front right wheel to the side of the master cylinder 14 and the circuit control valve 36 via the bypass channel 61a.

The pressure regulator 54a is the electromagnetic valve that can only be switched between a full-open state and a full-closed state. The pressure regulator 54a is provided between the wheel cylinder 38a in the hydraulic brake 22a for the front right wheel and the accumulator 71. In the open state, the pressure regulator 54a supplies the hydraulic oil that has been supplied to the wheel cylinder 38a in the hydraulic brake 22a for the front right wheel to the accumulator 71, so as to reduce the hydraulic pressure. The accumulator 71 accumulates or releases the hydraulic oil while changing a volume of the accumulator 71 according to the hydraulic pressure of the hydraulic oil that is supplied via the pressure regulators 54a, 54b.

By repeating the intermittent opening/closing of the pressure regulator 54a, the pressure regulator 54a can regulate the flow rate of the hydraulic oil that flows from the wheel cylinder 38a in the hydraulic brake 22a for the front right wheel into the accumulator 71.

The booster regulator 58b is provided between a pipeline connecting the circuit control valve 36 and the booster regulator 58a and the wheel cylinder 38b in the hydraulic brake 22b for the rear left wheel. The booster regulator 58b can be controlled linearly and continuously regulates the flow rate of the hydraulic oil from a side of the master cylinder 14, the circuit control valve 36, the booster regulator 58a, and the wheel cylinder 38a in the hydraulic brake 22a for the front right wheel to the wheel cylinder 38b side of the hydraulic brake 22b for the rear left wheel.

The booster regulator 58b has a bypass channel 61b that includes a check valve 60b. The check valve 60b allows the movement of the hydraulic oil from the hydraulic brake 22b side of the rear left wheel to the side of the master cylinder 14 and the circuit control valve 36 via the bypass channel 61b. Meanwhile, the check valve 60b disallows the movement of the hydraulic oil from the side of the master cylinder 14 and the circuit control valve 36 to the hydraulic brake 22b side of the rear left wheel via the bypass channel 61b.

For example, when the booster regulator 58b is brought into the closed state due to failure of the booster regulator 58b, the check valve 60b guarantees the movement of the hydraulic oil from the hydraulic brake 22b side of the rear left wheel to the side of the master cylinder 14 and the circuit control valve 36 via the bypass channel 61b.

The pressure regulator 54b is the electromagnetic valve that can only be switched between the full-open state and the full-closed state. The pressure regulator 54b is provided between the wheel cylinder 38b in the hydraulic brake 22b for the rear left wheel and the accumulator 71. In the open state, the pressure regulator 54b supplies the hydraulic oil that has been supplied to the wheel cylinder 38b in the hydraulic brake 22b for the rear left wheel to the accumulator 71, so as to reduce the hydraulic pressure.

By repeating the intermittent opening/closing of the pressure regulator 54b, the pressure regulator 54b can regulate the flow rate of the hydraulic oil that flows from the wheel cylinder 38b in the hydraulic brake 22b for the rear left wheel into the accumulator 71.

The pump section 44 is driven by the motor 96 and discharges the hydraulic oil. Driving of the motor 96 is controlled by the ECU, which is not illustrated. The number of the pump section 44 is not limited to one.

A discharge side of the pump section 44 is connected to the pipeline that connects the circuit control valve 36 and the booster regulators 58a, 58b. The damper 73 is provided on the discharge side of the pump section 44. The damper 73 has a function of reducing a vibration or vibration noise that is associated with a change in the flow rate of the hydraulic oil in the hydraulic circuit 28.

A variable throttle 31 and a check valve 32 are provided between the damper 73 and the pipeline that connects the circuit control valve 36 and the booster regulators 58a, 58b. The variable throttle 31 regulates the flow rate of the hydraulic oil that is supplied via the damper 73. While the check valve 32 allows the movement of the hydraulic oil from the damper 73 side to a side of the pipeline that connects the circuit control valve 36 and the booster regulators 58a, 58b, the check valve 32 disallows the movement of the hydraulic oil in a reverse direction.

A check valve 69 is provided to a pipeline that connects the pressure regulators 54a, 54b and the suction side of the pump section 44. While the check valve 69 allows the movement of the hydraulic oil from the pressure regulators 54a, 54b side to the suction side of the pump section 44, the check valve 69 disallows the movement of the hydraulic oil in a reverse direction.

A first pressure sensor 24 is provided to a pipeline that communicates with the pressure chamber 13a in the master cylinder 14. The first pressure sensor 24 detects a pressure in the pressure chamber 13a (a master cylinder pressure). A second pressure sensor 26 is provided to a pipeline that communicates with the wheel cylinder 38a in the hydraulic brake 22a for the front right wheel. The second pressure sensor 26 detects a wheel cylinder pressure. The second pressure sensor 26 may be provided to a pipeline that communicates with the wheel cylinder 38b in the hydraulic brake 22b for the rear left wheel.

The other hydraulic circuit 30, to which the hydraulic oil is supplied from the pressure chamber 13b in the master cylinder 14, controls the hydraulic brake 22c for the front left wheel and the hydraulic brake 22d for the rear right wheel. The hydraulic circuit 30 is configured to be the same as the hydraulic circuit 28 except for points that the wheel cylinder 38a in the hydraulic brake 22a for the front right wheel in the above description on the hydraulic circuit 28 is replaced with the wheel cylinder 38c in the hydraulic brake 22c for the front left wheel and that the wheel cylinder 38b in the hydraulic brake 22b for the rear left wheel is replaced with the wheel cylinder 38d in the hydraulic brake 22d for the rear right wheel.

2. Overall Configuration of Brake Hydraulic Pressure Control Apparatus

As illustrated in FIG. 2, the brake hydraulic pressure control apparatus 20 according to this embodiment includes a pressure supply unit 90 and a hydraulic block 130. The hydraulic block 130 is formed with two systems of the hydraulic circuits, each of which includes the circuit control valve, the suction control valve, the booster regulators, the pressure regulators, the pressure sensors, the accumulator, the damper, and the like which are not illustrated and includes the plural oil channels connecting these components. The pressure supply unit 90 includes the motor 96 and a pump element 80 having two pump sections 44, and is attached to one side surface 130a of the hydraulic block 130.

The motor 96 and the two pump sections 44 can be generation sources of the NVH due to high-speed operation thereof. The brake hydraulic pressure control apparatus 20 is configured that the pressure supply unit 90, in which the motor 96 and the pump element 80 possibly becoming the generation sources of the NVH are integrated, is attached to the hydraulic block 130. A damper member 200 that is formed of ring-shaped elastic rubber, for example, is interposed between the pressure supply unit 90 and the hydraulic block 130. In this way, the vibration generated in the pressure supply unit 90 is unlikely to be transmitted to the hydraulic block 130. That is, in the brake hydraulic pressure control apparatus 20 according to this embodiment, the single damper member 200 takes the measure against the NVH by the motor 96 and the two pump sections 44.

3. Pressure Supply Module

A specific description will be made on a configuration example of the pressure supply unit 90 with reference to FIG. 3 to FIG. 5. FIG. 3 is a cross-sectional view of the pressure supply unit 90. FIG. 4 is a perspective view of the pump element 80, and the FIG. 5 is a cross-sectional view of the pump element 80. FIG. 5 is the cross-sectional view that is taken along cross section I-I of the pump element 80 illustrated in FIG. 4, and FIG. 3 is the cross-sectional view of the pressure supply unit 90 at the corresponding position.

As illustrated in FIG. 3, the pressure supply unit 90 is attached to the one side surface 130a of the hydraulic block 130. A method for fixing the pressure supply unit 90 to the hydraulic block 130 is not particularly limited as long as it is a method capable of dampening the vibration generated in the pressure supply unit 90. For example, the pressure supply unit 90 may be fixed to the hydraulic block 130 by providing a flange portion to a housing 91 of the pressure supply unit 90, then inserting a bolt through the flange portion while interposing elastic rubber as a damper between the bolt and the flange portion.

The pressure supply unit 90 includes the housing 91, the motor 96, and the pump element 80. The housing 91 has an accommodating section 91a that is a columnar internal space, and the motor 96 and the pump element 80 are accommodated in the accommodating section 91a.

The motor 96 includes a stator 97 and a rotor 98. The stator 97 is formed in an annular shape, and is attached along an inner circumferential surface of the accommodating section 91a of the housing 91. The rotor 98 is arranged on an inner diameter side of the stator 97, and is axially supported in an axially rotatable manner. The rotor 98 has a recessed section 98a that is at least opened to the hydraulic block 130 side. An extending direction of a rotation axis will hereinafter be referred to as an axial direction.

A shaft member 101 is provided to one end side (an upper side in FIG. 3) in the axial direction of the rotor 98. The shaft member 101 is supported in a projected section 92a of the housing 91 via a bearing, which is not illustrated. The other end side (a lower side in FIG. 3) in the axial direction of the rotor 98 is supported by the housing 91 via a bearing 94. The shaft member 101 extends in the recessed section 98a of the rotor 98, and a rotary member 123 is fixed to a tip side of the shaft member 101 in the recessed section 98a. The rotary member 123 is formed such that a surface thereof facing the pump element 80 side is tilted with respect to the axial direction. The rotary member 123 axially rotates with the rotor 98. The rotary member 123 may directly be fixed to the rotor 98 instead of the shaft member 101.

A swash plate 127 is arranged on the surface of the rotary member 123 facing the pump element 80 side via a bearing 125. A surface of the swash plate 127 on an opposite side from the rotary member 123 is supported by two pistons 151 of the pump element 80. The swash plate 127 does not rotate along with the axial rotation of the rotor 98. However, along with the axial rotation of the rotary member 123, a tilt direction of the swash plate 127 is changed according to the surface of the rotary member 123 tilted with respect to the axial direction. It may be configured that the swash plate 127 itself rotates along with the rotation of the rotor 98. However, in the configuration example of the brake hydraulic pressure control apparatus 20 according to this embodiment, since the swash plate 127 itself does not rotate, it is possible to reduce wear of the swash plate 127 or the pistons 151 caused by friction between the swash plate 127 and the pistons 151.

The pump element 80 is inserted in the recessed section 98a, which is provided to the rotor 98, from the hydraulic block 130 side via a center hole 93a provided to a housing cover 93. In this way, the pump element 80 is assembled to the rotor 98. The pump element 80 is fixed to the housing 91 and does not rotate with the rotor 98. At least a part of the pump element 80 only needs to be arranged in the recessed section 98a. Alternatively, the entire pump element 80 may be arranged in the recessed section 98a. The pump element 80 has the two pump sections 44 that are arranged at an interval of 180 degrees about the axis.

As illustrated in FIG. 4 and FIG. 5, the pump element 80 has the two pump sections 44 that are assembled to a pump body 159. The two pump sections 44 have the same configuration. A description will hereinafter be made on one of the pump sections 44.

The pump body 159 includes, as oil channels through which the hydraulic oil flows, an introduction channel 169 and a discharge channel 179. The pump body 159 also includes an accommodation chamber 153 into which the hydraulic oil is introduced via the introduction channel 169. The piston 151 is arranged in the accommodation chamber 153 in a freely reciprocal manner along the axial direction. The piston 151 is urged by a piston spring 155 in a direction in which a volume of the accommodation chamber 153 is increased.

A suction valve 161 is provided in an intermediate portion of the introduction channel 169. The suction valve 161 includes a valve body 165, a valve seat member 163, and a valve spring 167. The valve seat member 163 has a through hole 163a for the hydraulic oil, and the through hole 163a is opened/closed by the valve body 165. The valve body 165 is pressed against the valve seat member 163 by the valve spring 167. The suction valve 161 is configured as a one-way valve that allows the hydraulic oil to flow from the hydraulic block 130 side to the accommodation chamber 153 side.

A discharge valve 171 is provided in an intermediate portion of the discharge channel 179. The discharge valve 171 includes a valve body 175, a valve seat member 173, and a valve spring 177. The valve seat member 173 has a through hole 173a for the hydraulic oil, and the through hole 173a is opened/closed by the valve body 175. The valve body 175 is pressed against the valve seat member 173 by the valve spring 177. The discharge valve 171 is configured as a one-way valve that allows the hydraulic oil to flow from the accommodation chamber 153 side to the hydraulic block 130 side.

The introduction channel 169 and the discharge channel 179 respectively have openings 169a, 179a on surfaces opposing the one side surface 130a of the hydraulic block 130. Each of the introduction channel 169 and the discharge channel 179 communicates with the oil channel formed in the hydraulic block 130 (see FIG. 3). Groove sections 157a, 157b, in which seal rings 202a, 202b are respectively arranged, are respectively formed around the openings 169a, 179a. As illustrated in FIG. 3, in a state of being attached to the hydraulic block 130, the pressure supply unit 90 is held between the pump element 80 and the hydraulic block 130. In this way, it is possible to prevent leakage of the hydraulic oil flowing through the introduction channel 169 and the discharge channel 179 from the oil channels. The grooves defining the positions of the seal rings 202a, 202b may be provided on the hydraulic block 130 side.

4. Operation Example

A description will be made on an operation example of the brake hydraulic pressure control apparatus 20 according to this embodiment.

When an actuation command for an ESP or an ABS is input to the ECU, the ECU drives the motor 96. When the motor 96 is driven, the rotor 98 rotates about the axis. Along with the rotation of the rotor 98, the tilt direction of the swash plate 127 is changed. As a result, the piston 151, which is provided to each of the pump sections 44 in the pump element 80, reciprocates once in the accommodation chamber 153 while the rotor 98 makes one rotation.

At this time, along with the change in the tilt direction of the swash plate 127, the piston 151 is urged by the piston spring 155 and moves to the tip side, which increases the volume of the accommodation chamber 153. Consequently, the hydraulic pressure in the accommodation chamber 153 is reduced. While the discharge valve 171 is closed, the suction valve 161 is opened, and the hydraulic oil is introduced into the accommodation chamber 153.

When the tilt direction of the swash plate 127 is further changed, and the piston 151 is pressed against an urging force of the piston spring 155, the volume of the accommodation chamber 153 is reduced. Consequently, the hydraulic pressure in the accommodation chamber 153 is increased. While the suction valve 161 is closed, the discharge valve 171 is opened, and the hydraulic oil is discharged from the accommodation chamber 153.

Along with the rotation of the motor 96, the pump section 44 repeatedly suctions and discharges the hydraulic oil. A stroke amount of the piston 151 is changed according to a tilt angle of the swash plate 127. Thus, by adjusting the tilt angle of the swash plate 127, it is possible to set a discharge amount of the hydraulic oil from the pump section 44. Here, since the two pump sections 44 are arranged at the interval of 180 degrees, the suction and the discharge of the hydraulic oil by the pump sections 44 are performed in reverse phases.

The ECU controls the booster regulators 58, the pressure regulators 54, and the like while making the pump sections 44 to discharge the hydraulic oil as described above, so as to control the brake hydraulic pressure generated to each of the wheels 38.

5. Effects

In the brake hydraulic pressure control apparatus 20 according to this embodiment that has been described so far, the motor 96 and the pump element 80, which can be the generation sources of the NVH, are integrated as the pressure supply unit 90 and attached to the hydraulic block 130. Thus, the measure against the NVH generated by the motor 96 and the pump element 80 can be taken by the common damper member 200.

In addition, the brake hydraulic pressure control apparatus 20 is configured that at least a part of the pump element 80 is inserted in the recessed section 98a provided to the rotor 98 of the motor 96. Accordingly, when the motor 96 and the pump element 80 are arranged as a unit, enlargement of such a unit in the axial direction can be suppressed. In addition, since the pump element 80 is not provided to the hydraulic block 130, the hydraulic block 130 can be downsized. Therefore, it is possible to downsize the entire outer shape of the brake hydraulic pressure control apparatus 20.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

In the above embodiment, the description has been made on the brake hydraulic pressure control apparatus that is mounted to the four-wheeled motor vehicle as the example. However, the present invention is not limited to such an example. The brake hydraulic pressure control apparatus may be mounted to a two-wheeled motor vehicle such as a motorcycle or other vehicles. In addition, in the above embodiment, the description has been made on the brake hydraulic pressure control apparatus that includes the two systems of the hydraulic circuits as the example. However, the brake hydraulic pressure control apparatus may include three or more systems of the hydraulic circuits.

REFERENCE SIGNS LIST

20: Brake hydraulic pressure control apparatus
28, 30: Hydraulic circuit
34: Suction control valve
36: Circuit control valve
44: Pump section
54: Pressure regulator
58: Booster regulator
80: Pump element
90: Pressure supply unit
96: Motor
97: Stator
98: Rotor
130: Hydraulic block
200: Damper member
202a, 202b: Seal ring

The invention claimed is:

1. A brake hydraulic pressure control apparatus (20) configured to control a hydraulic pressure in plural systems of hydraulic circuits (28, 30), the brake hydraulic pressure control apparatus comprising:
    a pressure supply unit (90) that includes a motor (96) and a pump element (80); and
    a hydraulic block (130) that includes an oil channel connected to the pressure supply unit (90) and control valves (34, 36, 54, 58) regulating a hydraulic pressure in each of the plural systems of the hydraulic circuits (28, 30), wherein
    the pressure supply unit (90) includes:
        the motor (96) having a stator (97) and a rotor (98);
        a swash plate (127) arranged to be tilted with respect to an axial direction of a rotation axis of the rotor (98); and
        the pump element (80) having plural pump sections (44) driven by rotation of the motor (96), and
    at least a part of the pump element (80) is arranged in the rotor (98) wherein
    the pressure supply unit (90) is attached to one side surface (130a) of the hydraulic block (130),
    the pump element (80) has: an introduction channel (169) through which hydraulic oil is introduced; and a discharge channel (179) from which the hydraulic oil is discharged, and
    each of the introduction channel (169) and the discharge channel (179) is opened to a surface opposing the one side surface (130a) of the hydraulic block (130), and
wherein the brake hydraulic pressure control apparatus further includes seal rings (202a, 202b) around a connected portion between the introduction channel (169) of the pressure supply unit (90) and the oil channel of the hydraulic block (130) and around a connected portion between the discharge channel (179) of the pressure supply unit (90) and the oil channel of the hydraulic block (130).

2. The brake hydraulic pressure control apparatus according to claim 1, wherein
the pump element (80) is inserted in a recessed section (98*a*) or a hole provided to the rotor (98) from a hydraulic block (130) side so as to be assembled to the rotor, and
a piston (151) of each of the pump sections (44) abuts the swash plate (127) arranged in the recessed section (98*a*) or the hole.

3. The brake hydraulic pressure control apparatus according to claim 1, wherein
a damper member (200) is interposed between the pressure supply unit (90) and the hydraulic block (130).

4. The brake hydraulic pressure control apparatus according to claim 2, wherein
each of the pump sections (44) has:
the piston (151) that reciprocates substantially parallel to the axial direction of the rotation axis along with rotation of the motor (96);
an accommodation chamber (153) that accommodates a part of the piston (151) and into which a brake fluid is introduced; and
a discharge valve (180) that discharges the brake fluid from the accommodation chamber (153).

5. The brake hydraulic pressure control apparatus according to claim 2, wherein
a damper member (200) is interposed between the pressure supply unit (90) and the hydraulic block (130).

6. The brake hydraulic pressure control apparatus according to claim 5, wherein
each of the pump sections (44) has:
the piston (151) that reciprocates substantially parallel to the axial direction of the rotation axis along with rotation of the motor (96);
an accommodation chamber (153) that accommodates a part of the piston (151) and into which a brake fluid is introduced; and
a discharge valve (180) that discharges the brake fluid from the accommodation chamber (153).

* * * * *